United States Patent [19]

Nembach

[11] Patent Number: 4,480,502

[45] Date of Patent: Nov. 6, 1984

[54] HYDRO-MECHANICAL MULTIPLE-WHEEL DRIVE FOR SELF-DRIVING HEAVY VEHICLES

[75] Inventor: Siegfried Nembach, Immenstaad, Fed. Rep. of Germany

[73] Assignee: Zahnradfabrik Friedrichshafen Aktiengesellschaft, Fed. Rep. of Germany

[21] Appl. No.: 300,750

[22] Filed: Sep. 10, 1981

[30] Foreign Application Priority Data

Sep. 19, 1980 [DE] Fed. Rep. of Germany ....... 3035522

[51] Int. Cl.$^3$ .................. F16H 47/00; F16H 37/06
[52] U.S. Cl. ................................. 74/733; 74/730; 74/664; 180/243
[58] Field of Search ................ 74/730, 731, 732, 733, 74/655, 664, 856; 180/242, 243

[56] References Cited

U.S. PATENT DOCUMENTS

| | | | |
|---|---|---|---|
| 3,053,043 | 9/1962 | Knowler | 180/243 |
| 3,354,977 | 11/1967 | Swift | 180/242 |
| 3,361,223 | 1/1968 | Bauer | 180/243 |
| 3,415,334 | 12/1968 | Vriend | 180/243 |
| 3,430,722 | 3/1969 | Budzich | 180/243 |
| 3,736,732 | 6/1973 | Jennings et al. | 180/243 |
| 4,020,917 | 5/1977 | Lutterschmidt | 180/242 |
| 4,183,419 | 1/1980 | Henn et al. | 180/243 |
| 4,244,184 | 1/1981 | Baldauf et al. | 180/242 |
| 4,341,133 | 7/1982 | Sakamoto | 74/730 |

FOREIGN PATENT DOCUMENTS 2452835 5/1975 Fed. Rep. of Germany ........ 74/730

*Primary Examiner*—Allan D. Herrmann
*Assistant Examiner*—Bruce F. Wojciechowski
*Attorney, Agent, or Firm*—Hayes, Davis & Soloway

[57] ABSTRACT

A hydrostatic-mechanical multiple-wheel drive for heavy vehicles with a multi-gear transmission for driving main driving wheels and hydrostatically operated additional driving wheels to be connected, as required, by themselves or when in one of the lower gears, including a variable displacement pump, driven directly proportionally to the speed of the main drive motor, for acting upon the additional driving wheels and an auxiliary pump acting as a filling and control pump, wherein, in order to control the speed with which the additional driving wheels are driven to that of the vehicle wheels, in particular to achieve synchronous running of these wheels, provision is made for orifices and/or throttles in the oil circuit of the auxiliary pump for varying the control pressure for the adjusting cylinder of the variable displacement pump so as to adjust these against the restoring force of the pump and of springs in the adjusting cylinder to the control pressure corresponding to the desired speed.

7 Claims, 1 Drawing Figure

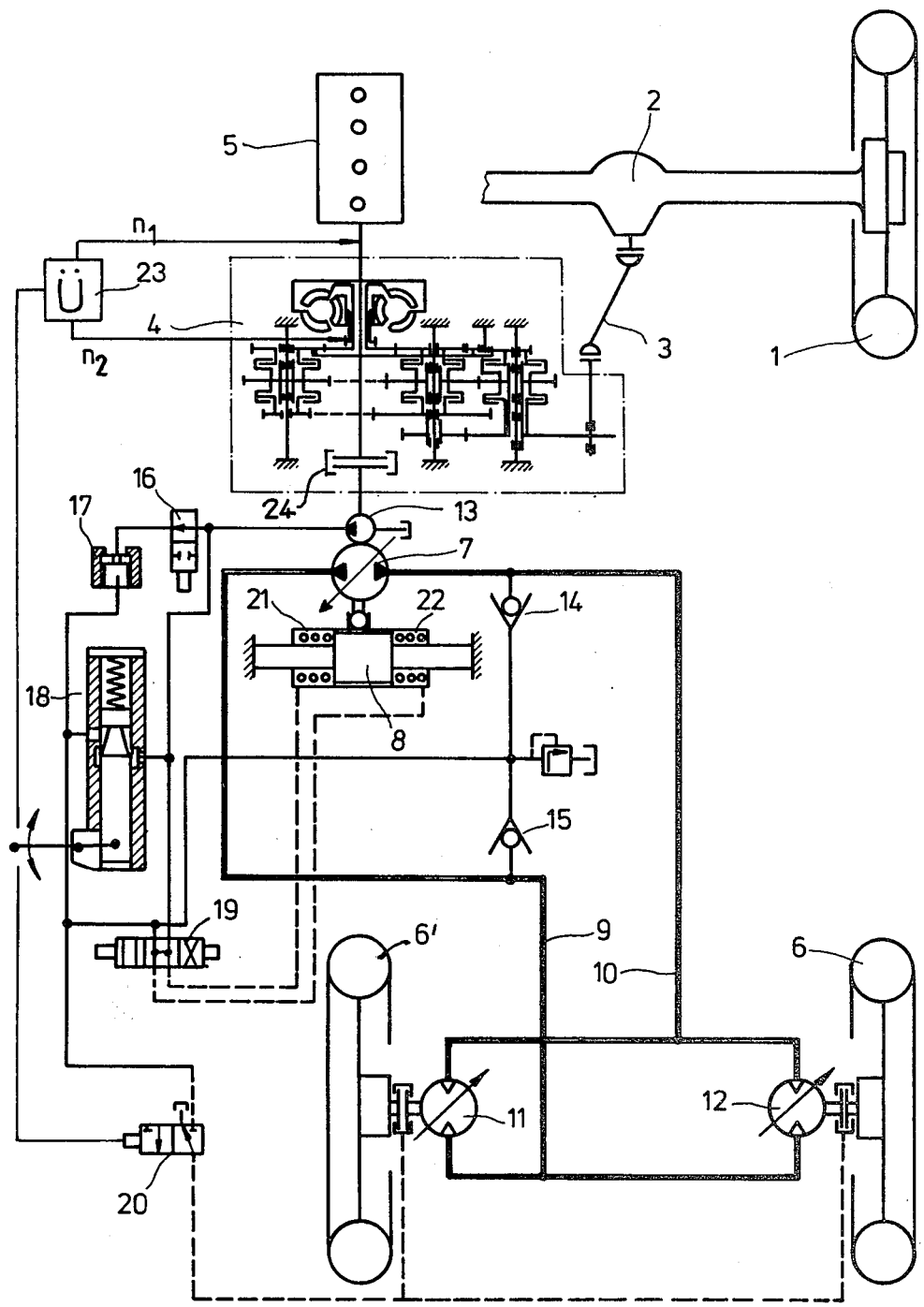

HYDRO-MECHANICAL MULTIPLE-WHEEL DRIVE FOR SELF-DRIVING HEAVY VEHICLES

This invention relates to a hydrostatic-mechanical multiple-wheel drive, for self-propelled heavy vehicles, consisting of a multi-gear transmission connected to drive main driving wheels, and a hydrostatic drive for additional driving wheels, in which the additional driving wheels may be engaged as desired either by themselves or through the lower gears of the multi-gear transmission. The multi-gear transmission for driving the vehicle wheels may be a mechanical transmission with several gears or a hydrodynamic change-underload transmission.

With such a multiple-wheel drive, the multi-gear transmission and the variable displacement pump of the hydrostatic drive for the additional driving wheels are driven directly from the main drive motor of the heavy vehicle, whereby the main driving wheels are usually driven from the multi-gear transmission mechanically via articulated shafts, cardan drives, etc., while the variable displacement pump of the hydrostatic drive is connected via lines with the hydromotors driving the additional driving wheels. With this arrangement additional clutches, transmission gearing and similar driving elements may be provided between the hydromotors and the wheels to be driven.

Multiple-wheel drives of the aforementioned kind are already known whereby the main driving wheels and the additional driving wheels are engaged only in the lower driving speeds corresponding to the gear stages with the highest transmission ratios (1st and 2nd gear) and drive the vehicle, while in the upper gear stages (3rd, 4th gear, etc.) only the main drivingwheels are driven from the transmission. This is done because there is a necessity for the additional drive when the heavy vehicle is working under difficult ground conditions. On the road when the vehicle is driven at higher speed, the additional drive is generally unnecessary and often is a hindrance with regard to the steering and additional energy consumption. For this reason the hydrostatic additional drive is usually coupled to the gears of the transmission and is connected only in the first and second forward or reversing gear while being switched off in the other gears.

To obtain satisfactory operation it is necessary to drive the additional driving wheels when engaged in such a way that their circumferential speed matches as closely as possible the circumferential speed of the vehicle wheels and under certain working conditions is even slightly higher than that of the main driving wheels. It is important that this relationship between the circumferential speeds remains the same over the entire speed range of both wheels.

Moreover, it must be possible for the output of the hydrostatic driving circuit for the additional driving wheels to be variable in order to ensure optimum drive efficiency (adapting to the ground conditions, change of driving direction, etc.). Furthermore it is necessary to have an overload protection for the prime mover.

In order to comply with these conditions a number of proposals have been made, all consisting of more or less complicated electrically or electronically working control systems. Thus, for instance, an electronic control for vehicles with a main and an auxiliary vehicle drive of the just described kind has been made known in U.S. Patent Ser. No. 4,186,816, wherein therespective speeds are measured via sensors on the main drive and on the auxiliary drive and where the auxiliary drive is controlled as a function of the measured values.

It is also known to allocate an AC generator to the main drive (see U.S. Pat. No. 3,561,557) for a dependent control of the driving wheels.

Circuit arrangements of this kind are complicated and can only be used under limited conditions for controlling the hydrostatic drive for the additional driving wheels if any degree of efficiency is to be achieved with regard to the driving power.

It is therefore an object of the invention to provide a multiple-wheel drive in which the circumferential speed between main driving wheels and additional driving wheels, which has hydraulic members in the oil circuit of the additional drive and can be directly matched to the characteristics of the individual gears as well as to the speed of the drive motor solely via the pressure in an additional oil circuit without the necessity of providing expensive sensors in the area of the vehicle driving wheels, for comparator devices, etc.

According to the invention there is provided a hydrostatic-mechanical multiple-wheel drive forself-driving heavy vehicles comprising a multi-gear transmission arranged to drive main driving wheels of the vehicle, hydrostatically operable additional driving wheels, hydrostatic drive means, means for connecting said hydrostatic drive means to drive said additional wheels when desired, a variable displacement pump, adapted to be driven directly by and proportionally to the speed of a main drive motor, connected to drive said hydrostatic drive means, the displacement of said variable displacement pump being controlled by an adjusting valve biased to a neutral condition by opposed force means and an auxiliary pump, wherein in order to control the speed with whih the additional driving wheels are driven by the hydrostatic drive means relative to that of the main driving wheels, the auxiliary pump is connected to power a control arrangement for controlling the adjusting valve of the variable displacement pump, so as to adjust the valve to a control pressure corresponding to the desired speed of the additional driving wheels.

The invention will now be described, by way of example, with reference to the accompanying drawings showing details and parts of a multiple-wheel drive according to the invention.

With a multiple-wheel drive according to the invention the circumferential speed of vehicle wheels and additional driving wheels of the two different transmission systems is approximately matched in that the hydrostatic variable displacement pump for the additional drive wheels is given a control, on which the output of the auxiliary pump, which has a constantworking volume, is working against throttles or diaphragms, resulting in the build-up of a control pressure which is dependent upon the speed of the drive motor. The control pressure achieved in this way is transferred via a directional control valve to the adjusting cylinder or piston of the variable displacement pump. The control pressure is counteracted by opposed springs and the intrinsic restoring force of the variable displacement pump which is largely a function of the working pressure.

Since the control with a throttle or diaphragm adjustment can be optimally designed for only one gear at a time, the proposal according to the invention, in a preferred form, provides the multi-wheel drive with additional orifices for further gears which can be connected via directional control slides.

In order to be able to influence the circumferential speed of the additional drive, for instance in order to match it to the main drive or to give it a certain amount of anticipation in relation to the main drive, at least one of the control throttles to be provided is adjustable so as to be able to vary the control pressure, including by hand.

Since the speed of the main drive motor and the working pressure of the hydrostatic drive influence the operation of the variable displacement pump in such a way that for a slow driving speed the vehicle is operated at high working pressure corresponding to high traction power and for a fast driving speed the vehicle is operated at low working pressure corresponding to low traction power, it follows that the output is automatically controlled. Moreover the hydrostatic additional drive for a multiple-wheel drive with the features of the invention remains operational even when, for example, the main drive has too much slippage or even reaches the stall point if a hydrodynamic drive is used.

The hydromotors, in particular, if they are to be used over several gears, are preferably variable displacement motors with their working volume ratio matched to the respective spacing between one gear and the next. Engaging and disengaging the clutches which connect the hydromotors to the additional driving wheels must be effected as a function of the gear selection in the transmission, so that they are at least effective in the first and second forward or reversing gear and so that in a neutral position of the transmission, the clutches are open.

In the drawing a main driving wheel 1 of a heavy vehicle (not shown) is drivable jointly with the second main driving wheel of a pair of wheels (again not shown) via purely mechanically working driving elements, i.e. a differential 2, a cardan shaft 3 and a mechanical multi-gear transmission 4, from a main drive motor 5 in the usual way at various speeds.

The transmission of the driving force from the motor 5 to the main driving wheel 1 may be effected in any alternative known manner by way of a gear change, in particular via a hydrodynamically working change-under-load transmission.

Referring now to the drawing a hydrostatically driven additional driving wheels 6 and 6' are provided and these are connected as desired when in a lower gear, for example, in the first and second forward or reversing gear. The drive for the hydrostatically driven additional wheels is derived as a function of a variable displacement pump 7 with adjusting cylinder 8, whereby depending upon the setting of the variable displacement pump and the speed of the drive motor the two hydromotors 11 and 12 are driven via pressure lines 9 or 10 in the known manner. An auxiliary pump 13 acting as filling and control pump is allocated to the variable displacement pump with the auxiliary pump being driven as a function of the rotational speed of motor 5 and ensures that the lines 9 and 10 are filled with oil via return valves 14 and 15 in the known manner.

To adjust the speed of the hydromotors 11, 12, provision is made in the oil circuit of the auxiliary pump 13 for a directional control sequence valve 16, an orifice 17, an adjusting throttle 18 and a 4/3-way valve 19. The adjusting device 8 of the variable displacement pump 7 is adjusted via these control elements against the intrinsic restoring force of the displacement pump and against the springs 21 or 22 as a function of the speed with which the auxiliary pump 13 is driven, so that for a slow driving speed, i.e. when the drive motor 5 is operating in the lower range of a gear, high working pressure and thus high traction power is achieved within the driving wheels, while for a high driving speed the vehicle is operated at low working pressure corresponding to low traction power.

It is advantageous to design the hydromotors as variable displacement motors if effective over several gears and to match their working volume ratio to the respective spacing between one gear and the next. In this case the hydromotors may be connected and disconnected by a sequence valve 20 as a function of the gear selection in the main transmission 4, as indicated by the dotted line in the drawing whereby the hydromotors are effective only in the first and second forward or reversing gear, the clutches provided between hydromotors and wheel drive, as indicated by the dotted line, having been disengaged.

With this arrangement the sequence valve may be operated by hand. According to another preferred arrangement, the sequence valve may alternatively be operated automatically as a function of an automatic switching sequence. To cater for this possibility, a monitor 23 is provided which senses and compares the speeds $n_1$ and $n_2$, i.e., the input and output speeds of the converter. As a function of this measuring process the additional drive is connected when, and only when, the converter of the main drive is depressed, as indicated by the functional line to the sequence valve 20.

This automatic switching sequence has the advantage that the additional drive is connected when there is a high demand for traction power, e.g. during a drop in the speed ratio from pump to turbine from 1.0 to 0.8 or even 0.6. It is possible, as a function of this monitor, to control not only the connecting and disconnecting of the additional drive, but, as required, also to increase the effect of the additional drive for a larger speed difference by automatically influencing the control of the pump.

The realization described above may be adapted in various ways to the practical circumstances. In particular, if, for example, the additional drive is to remain connected for at least one more gear of the main drive, it is possible within the framework of the invention, to provide additional orifices in order to influence the inflow section for this further gear corresponding to the indicated rule. This control again may be effected automatically in the corresponding manner by means of already known measuring elements as a function of the gears and/or speed.

Means for automatically disconnecting the auxiliary and variable displacement pumps from the main drive during idling or when the multi-gear transmission is in one of the fast gears may be a magnetic clutch 24 arranged in between the driving shaft of transmission and pumps 13 and 7.

In different gears of the multi-gear transmission the variable displacement pump 7 is displaced by the adjusting cylinder 8 by different pressure differentials. In the first gear with the change-over valve 16 in its first position as shown in the drawing orifice 17 and throttle 18 are in parallel which means a large cross section of passage to the left inlet port of 4/3 way valve 19.

In the second gear the change-over valve 16 is shifted to its closed position. In this position only a small cross section of passage is open from pump 13 across throttle 18 to valve 19 and adjusting cylinder 8. In the first gear i.e. the first position of change-over valve 16 the pressure differential is smaller than in the second gear or position respectively.

I claim:

1. A hydrostatic-mechanical multiple-wheel drive for self-driving heavy vehicles comprising a multi-gear transmission arranged to drive main driving wheels of the vehicle, hydrostatically operable additional driving wheels, hydrostatic drive means, means for connecting said hydrostatic drive means to drive said additional wheels when desired, a variable displacement pump, adapted to be driven directly by and proportionally to the speed of a main drive motor, connected to drive said hydrostatic drive means, the displacement of said variable displacement pump being controlled by an adjusting valve biased to a null condition by opposed force means and an auxiliary pump, wherein, in order to control the speed with which the additional driving wheels are driven by the hydrostatic drive means relative to that of the main driving wheels, the auxiliary pump is connected to power a control arrangement for controlling the adjusting valve of the variable displacement pump, so as to adjust the valve to a control pressure corresponding to the desired speed of the additional driving wheels further comprising an adjusting throttle, which is adjustable as a function of the individual gears of the multi-gear transmissions, is arranged in the oil circuit of the auxiliary pump, by way of which the control pressure is adjusted between high and low thereby influencing the hydrostatic drive.

2. A hydrostatic-mechanical multiple-wheel drive according to claim 1, the adjusting throttle having operating positions matching the normal load values of the gears for optimum operation for the most economical operation or for normal throttling when connecting the additional driving wheels, which, apart from manual interference, can only be overcome by an auxiliary force means, arranged to act in a manner which increases the throttle effect.

3. A hydrostatic-mechanical multiple-wheel drive for self-driving heavy vehicles comprising a multi-gear transmission arranged to drive main driving wheels of the vehicle, hydrostatically operable additional driving wheels, hydrostatic drive means, means for connecting said hydrostatic drive means to drive said additional wheels when desired, a variable displacement pump, adapted to be driven directly by and proportionally to the speed of a main drive motor, connected to drive said hydrostatic drive means, the displacement of said variable displacement pump being controlled by an adjusting valve biased to a null condition by opposed force means and an auxiliary pump, wherein, in order to control the speed with which the additional driving wheels are driven by the hydrostatic drive means relative to that of the main driving wheels, the auxiliary pump is connected to power a control arrangement for controlling the adjusting valve of the variable displacement pump, so as to adjust the valve to a control pressure corresponding to the desired speed of the additional driving wheels wherein a large overall cross section is allocated to the first gear and a smaller overall cross section of the connectable inflow sections to the second gear of the multi-gear transmission by means of a change-over valve 16.

4. A hydrostatic-mechanical multiple-wheel drive for self-driving heavy vehicles comprising a multi-gear transmission arranged to drive main driving wheels of the vehicle, hydrostatically operable additional driving wheels, hydrostatic drive means, means for connecting said hydrostatic drive means to drive said additional wheels when desired, a variable displacement pump, adapted to be driven directly by and proportionally to the speed of a main drive motor, connected to drive said hydrostatic drive means, the displacement of said variable displacement pump being controlled by an adjusting valve biased to a null condition by opposed force means and an auxiliary pump, wherein, in order to control the speed with which the additional driving wheels are driven by the hydrostatic drive means relative to that of the main driving wheels, the auxiliary pump is connected to power a control arrangement for controlling the adjusting valve of the variable displacement pump, so as to adjust the valve to a control pressure corresponding to the desired speed of the additional driving wheels further comprising means for disconnecting the auxiliary and variable displacement pumps automatically from the main drive during idling or when the multi-gear transmission is in one of the fast gears.

5. A hydrostatic-mechanical multiple-wheel drive according to claim 1, wherein the hydromotors for the additional driving wheels are variable displacement motors adjustable so that their working volume ratio is adapted to the respectively selected gear of the multi-gear transmission.

6. A hydrostatic-mechanical multiple-wheel drive according to claim 1, comprising an automatic switching sequence for automatically connecting the hydromotors to the additional drive wheels when desired.

7. A hydrostatic-mechanical multiple-wheel drive according to claim 6, wherein the automatic switching sequence comprises a monitor which, by comparing rotational speeds $n_1$ and $n_2$, monitors the operation of the multi-gear transmission and, as a function of the latter connects the additional drive by releasing the sequence valve.

* * * * *